United States Patent [19]

Hasebe et al.

[11] 4,362,448
[45] Dec. 7, 1982

[54] APPARATUS FOR REMOVING BURRS FROM CONTINUOUS CAST SLABS

[75] Inventors: Nobuhisa Hasebe; Hiroshi Kawada, both of Yokohama; Tatsuo Kobatake, Fukuyama, all of Japan

[73] Assignee: Nippon Kokan Kabushiki Kaisha, Tokyo, Japan

[21] Appl. No.: 193,900

[22] Filed: Oct. 6, 1980

[30] Foreign Application Priority Data

Oct. 9, 1979 [JP] Japan .......................... 54-139109[U]

[51] Int. Cl.³ .......................... B23D 1/10; B23D 13/02
[52] U.S. Cl. .................................... 409/300; 164/263; 228/13; 409/301; 409/308; 409/319; 409/329
[58] Field of Search ............... 409/300, 297, 296, 301, 409/308, 312, 319, 329, 140; 164/263, 70.1, 70; 228/13

[56] References Cited

U.S. PATENT DOCUMENTS 609,643 8/1898 Wesel .......................... 409/312 X
2,120,316 6/1938 Stone .......................... 409/300 X

FOREIGN PATENT DOCUMENTS 53-44170 4/1978 Japan .

Primary Examiner—Z. R. Bilinsky
Attorney, Agent, or Firm—Moonray Kojima

[57] ABSTRACT

When a continuous cast slab is cut, such as by gas cutting, burrs tend to be caused at the cut edges. These burrs are removed by a plurality of edged cutting tools which are installed serially along the width of the slab to be treated. Each of the edged cutting tools may be selectively raised or tilted in the vertical direction or moved in the horizontal direction to substantially follow the warped or otherwise uneven surface on which the burrs are located. In this manner, substantially all of the burrs are exactly and completely removed.

3 Claims, 3 Drawing Figures

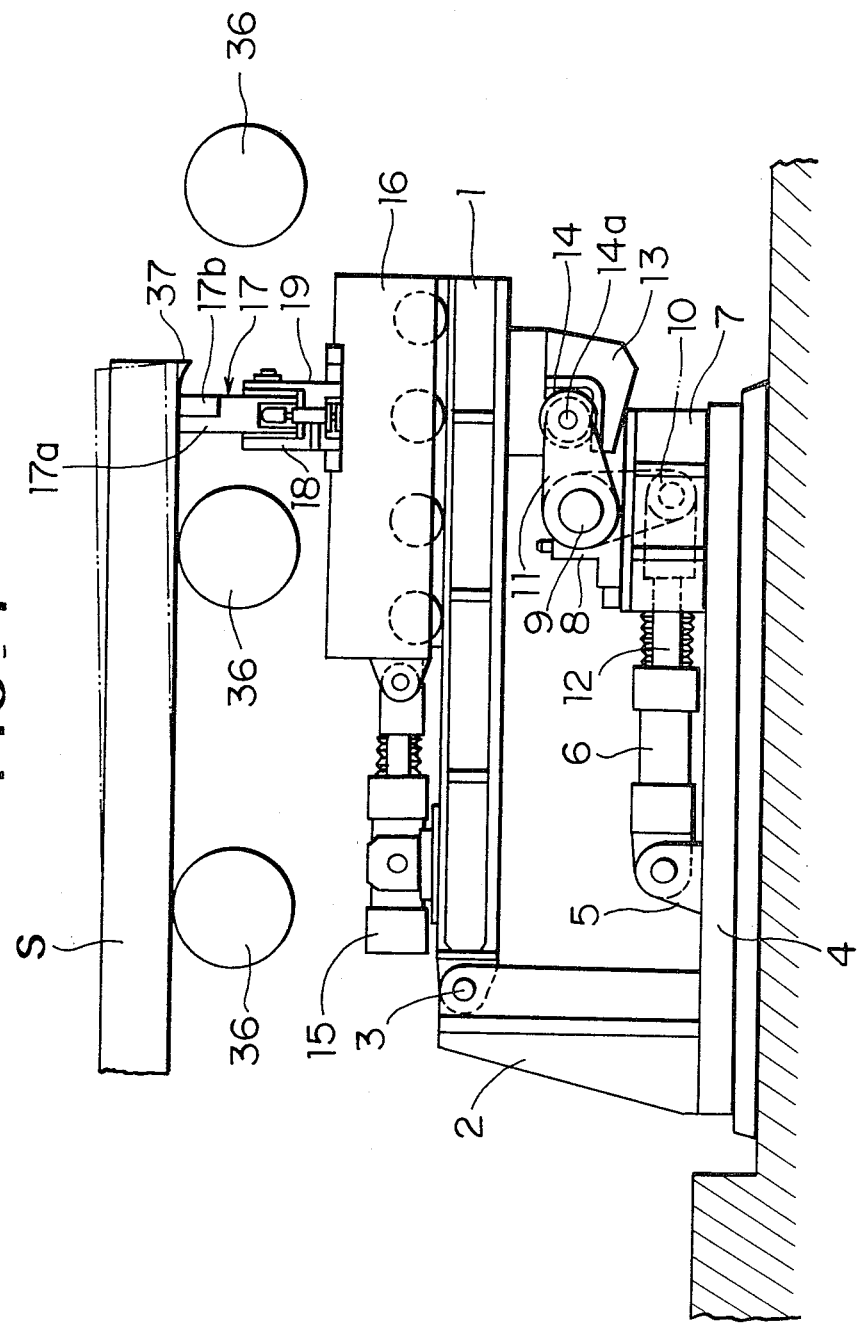

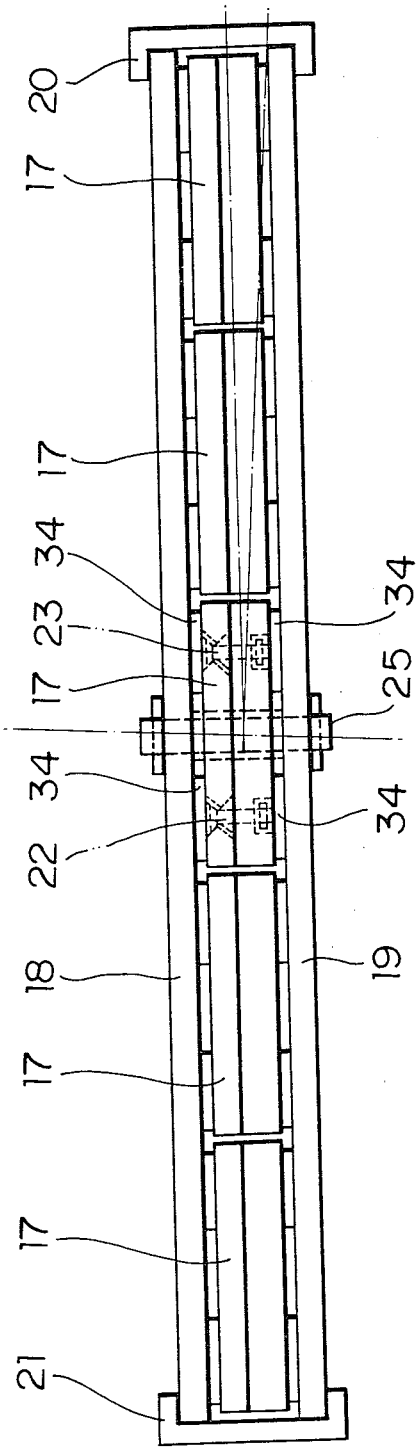
FIG_2

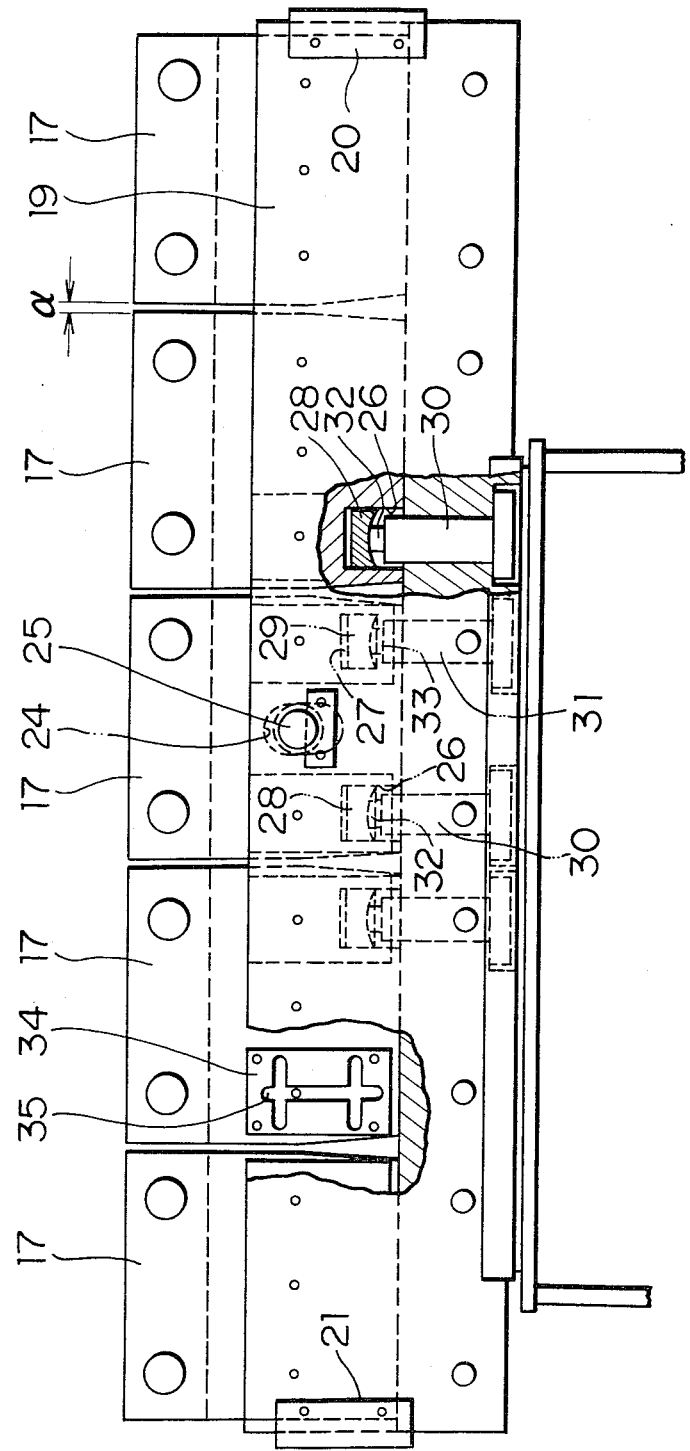

APPARATUS FOR REMOVING BURRS FROM CONTINUOUS CAST SLABS

BACKGROUND OF THE INVENTION

This invention relates to an apparatus for removing burrs which remain at the cut edges of a continuous cast slab after the slab is cut, such as by gas cutting.

Priorly, continuous cast slabs were finished by a scarfing procedure, such as using manual or machine means. The scarfing was done after cooling of the continuous cast slab to room temperature outside of the continuous casting apparatus.

However, recently, it has become the acceptable practice to transfer a hot slab into a heating furnace following the continuous casting apparatus, instead of first cooling the continuous cast slab to room temperature. One problem which arises in this new practice is the necessity of removing burrs which remain at the trimmed edges, such as at the lower surface portion when the slab is cut, such as by a gas cutting method. The burrs will cause such defects as rolling scratches or increasing crop amount. Hence, these burrs should be removed in advance of further processing.

A variety of solutions have been proposed. For example, the inventors hereof have previously proposed in Japanese Utility Model Application Ser. No. 44,170/1978, that the motion of the transferring slab on a roll table be utilized to raise a cutting tool upwardly for removing the burrs. Also, it is known that the cutting tools may be horizontally moved on a stationary slab. However, in either event, the foregoing apparatus employed a single cutting tool. Thus, disadvantageously, for example, if the slab were warped or otherwise uneven in the surface contour, the priorly used cutting edges would not closely contact the surface contour of the slab and the burrs would not be completely and exactly removed, and the remaining burrs and parts of burrs would continue to remain a problem.

SUMMARY OF THE INVENTION

Accordingly, an object of the invention is to eliminate the foregoing and other deficiencies of the prior art.

Other objects are to provide an apparatus which would remove substantially all of the burrs and as completely as possible of the burrs remaining on a cut edge of a continuously cast slab after cutting thereof, and to provide a plurality of individually manipulatable cutting edges which could be selectively manipulated to enable burrs to be removed from warped and other uneven surfaces.

The foregoing and other objects and advantages of the invention are attained by the invention wherein a plurality of edged cutting tools along the width direction of the continuous cast slab are serially disposed and means are provided for selectively manipulating each cutting edge to follow the overall lower or other contour surface of the slab on which are located burrs resulting from the cutting, and thereby removed substantially all of the burrs and as completely as possible to produce a smoother substantially burrless surface.

In the inventive apparatus, the cutting tools are arranged serially on a supporting truck, with at least two cylindrical driving means on either side of an oblong hole for moving each tool upward and downward and for tilting about the hole. Each cutting tool comprises an abrasive or other suitable cutting edge held by a holder. The truck is suitably disposed on a support bed. Another driving mechanism is provided for raising and lower the bed. The cutting tool apparatus may thus be disposed, for example, below a roller arrangement whereat a continuous cast slab is rolled out. The continuous cast slab, after cutting or trimming, may thus be stopped, for example, above the cutting tools. Then, the other driving means will raise the bed for a rough adjustment of the cutting tools against the slab close to the burrs. The first driving means can be moved to adjust the horizontal position of the cutting tools. To obtain fine adjustment of the cutting edges against the burrs, the driving cylinders of each cutting tool are selectively manipulated, such as up, or tilted or moved horizontally, about a center point, to finally fit the contour of the slab surface. In this manner, the burrs will be substantially completely removed as to the height of the burrs above the surface, and as to the number of burrs and regardless of the type of surface, such as warped, uneven contour of the surface of the slab. Advantageously, the invention removes substantially all of the burrs by selectively manipulating the cutting edge along the surface of the slab.

A feature of the invention is a plurality of cutting tools arranged serially, for example, to fit along the width of a continuous cast slab, and having means for selectively moving each tool upwardly or tilted in the horizontal or vertical direction to match the surface of the slab and thereby substantially remove completely and exactly all of the burrs remaining at the cut edges after the slab is cut.

Another feature is the use in each cutting tool of a replaceable cutting edge.

A further feature is each cutting tool having toward the center thereof an oblong hole to enable means to change the vertical position of the surface of the cutting edge of the cutting tool, such as to raise the edge while keeping the surface level, or tilting same at an angle, by manipulating the tool about the hole.

Another feature is the use of two cylinders and pistons arrangement, one placed on each side of a center oblong hole in each tool, for selectively moving both sides of the tool concurrently or at different levels thereby to tilt each tool at a suitable vertical angle.

A still further feature is an apparatus for removing the burrs wherein are provided a base, a standard attached to the base, a bed rotatably attached to the standard, a piston drive arrangement and link gear means for vertically moving the bed, a second piston drive arrangement for moving the truck along the plane of the bed to adjust the position of the cutting tools with regard to the continuous cast slab placed movably above the tools, a plurality of cutting tools arranged on the truck and means for selectively manipulating the level of each cutting tool so that the cutting tool edges will follow the slab surface contour, whereby substantially all of the burrs are removed without regard to the unevenness of the slab surface.

A further feature is the use of a first drive arrangement connected to a base, and a link means for moving in a vertical direction a bed on which is disposed a truck for holding the tools, and use of a second rod drive means to adjust the position of the tools.

BRIEF DESCRIPTION OF THE DRAWING

FIG. 1 depicts, in an outline elevational view, an illustrative embodiment of the invention;

FIG. 2 depicts, in an enlarged plan view, the cutting tool arrangement of the embodiment depicted in FIG. 1; and FIG. 3 depicts, a front view of the cutting tool arrangement of FIG. 2.

DETAILED DESCRIPTION OF THE PREFERRED EMBODIMENTS

Turning now to FIG. 1, there is depicted an outline view of an illustrative embodiment of the invention. The apparatus comprises a base 4, to which are connected a support standard 2 and a bracket 5. Connected to rotate about bracket 5 is the rear end of a clevis cylinder 6. Rod 12 connected to cylinder 6 is connected to link 10 at the other end. Structure 7 connected to base 4 holds rotatably link 10 as depicted. On support 7 is a bearing 8 which is connected to a pivot shaft 9 mounted thereon and secured with links 10 and 11 by each end. The other end of the link 11 is pivotally mounted on a shaft 14a of a roll 14 disposed within jaws 13 which are attached to the lower surface of bed 1. Thus, when rod 12 of cylinder 6 is moved laterally to the right, links 10,11 will move counterclockwise, and shaft 14a and roll 14 caused to move upward and to cause jaws 13 to move upward and thus move bed upwardly about shaft 3.

Bed 1 is connected toward one end via shaft 3 to standard 2 and has at the other end a jaw like connection means 13. On top of bed 1 is connected a trunnion cylinder 15 which suitably may be moved horizontally to move truck 16 laterally along its wheels in the plane of the bed 1. The truck 16 is furnished toward the upper surface with cutting tool supporting frames 18,19, between which are disposed a plurality of cutting tools 17, each with cutting edges 17b attached to tool holder 17a.

In a typical arrangement, after casting the slab "S" may be moved by rolls 36 to be positioned for burr removal. When, for example, the slab is cut, such as by gas cutting, there will tend to be burrs remaining at one or more surfaces, at the cut edges, such as shown by burrs 37 at the lower right surface edge of slab "S" in FIG. 1. The rolls 36 will move the slab "S" so that the burrs will be adjacent the cutting edges 17b of each tool 17.

Each cutting tool 17 comprises a holder 17a and a cutting edge 17b. The cutting edge 17b is secured to the holder 17a with flat headed bolts 22,23 (as shown in FIG. 2).

A plurality of tools 17 are arranged serially with spaces "α" therebetween (see FIG. 3), and between frames 18,19, and held at the ends by metal clamps 20,21, as depicted in FIG. 2. Bearing or sliding plates 34, having oil grooves 35 (see FIG. 3) are disposed between the cutting tools 17, and frames 18,19, as depicted. These bearings provide suitable lubrication to enable ready movement of the tools 17. Each tool is held in the frame by shaft 25 positioned through hole 24 in each tool (as shown in FIG. 3). The hole 24 is oblong in shape with the larger dimension disposed to be vertical so that the holder can be moved up or down the distance of the larger dimension of the hole. Thus, each tool 17 can be moved with the cutting edge surface level the distance of the larger dimension of the hole, or the surface of the cutting edge can be tilted about the hole, by suitable selective movement of the different rods 30,31. As depicted in FIG. 2, the frames 18,19 and also each tool 17 may be moved horizontally in either direction, such as, for example, by the angle depicted by means not shown. Although in FIGS. 2 and 3, there is depicted, for purposes of illustration, only one shaft 25 and only one oblong hole 24 for the entire frame arrangement, it is to be understood that each tool may have such hole and shaft arrangement for individual movement of each tool.

Turning now to FIG. 3, each tool 17 has cylindrical hole, such as 26 and 27, bored on either side of the oblong hole 24, and located toward the lower portion of the tool holder 17a. Within the cylinders are rods 32,33 having rounded heads and connected to movable cylinders 30,31. Between the rounded heads of the rods 32,33 toward the top of the holes are disposed rounded head pieces 28,29. The two cylinder and rod means can be selectively operated to enable the upper surface of the cutting tool edge 17b to be level or at a tilted angle to suitably fit the contour of the warped surface of the slab.

The above discussed embodiments and compartments thereof, such as the elevating mechanism for selectively moving the upper surface of each cutting tool edge to be at an appropriate angular position, and the mechanism for moving the bed 1, are not limited to the structural positions depicted. For example, if the slab is turned over during transfer, the inventive apparatus may be installed above the slab. Moreover, a pair or more of such apparatus, one for each surface may be concurrently employed.

In operation, after the slab "S" is cut or trimmed, such as by gas cutting, the cut slab "S" is moved along rolls 36 and stopped at a predetermined position above the burr removing apparatus. Subsequently, rod 12 of clevis cylinder 16 is advance to the right, and pivot shaft 9 is rotated in the counterclockwise direction via link 10 and then link 11 is forced upwardly to push jaws 13 upwardly, and thus to push bed 1 upwardly accordingly. The control means for the different drive mechanism, although not shown, can be of any means used to operate the piston means. The truck 16 is appropriately placed by movement of the piston drive cylinder 15 until the cutting tool arrangement is appropriately located adjacent the burrs, as shown in FIG. 1. Then, cylinders 30 and 31 of each cutting tool 17 are raised upward up to the allowed length dimension of the oblong hole 24, so that each cutting edge 17b contacts the lower surface of the slab "S". In this case, if slab "S" were warped in its width direction, for example, each of the cutting tools 17b may be tilted around the shaft 25 along the warped or uneven contour surface of the slab "S". Thus, when the cutting tool truck 16 is advanced to the right, the burrs 37 at the lower surface of the slab "S" will be cut away by the cutting edge 17b, until substantially all of the number of burrs are removed with each burr being substantially exactly removed so that the remaining surface will be smooth and burrless.

According to the invention, the plurality of edged cutting tools 17 may be installed along the width of the slab. Since each of the edged cutting tools may be individually elevated with the cutting tool edge surface level or tilted, or moved horizontally, the burrs 37 are both exactly cut substantially with the surface of the slab and all of the burrs present are substantially removed completely, even if the slab "S" has a warped or uneven surface. By selectively manipulating the elevating means and the means for horizontally moving the tools, the cutting edge surface can follow the contour of the slab surface and thus effect effective exact removal of the height of each burr so that the burrs are effectively removed and the surface is thereafter smooth, and so that all of the burrs are completely removed. Furthermore, each tool 17 comprises a cutting edge portion and a holder portion; thus, the cutting edge portion itself on each tool may be readily removed and replaced or partially repaired without the expense of replacement of all of the tools.

The foregoing description is illustrative of the principles of the invention. Numerous modifications and extensions thereof would be apparent to the worker skilled in the art. All such modifications and extensions thereof are to be considered to be within the spirit and scope of the invention.

What is claimed is:

1. An apparatus for removing burrs from a surface of a continuous cast slab along the cut edge thereof, said slab being movable in a substantially horizontal direction, said slab comprising
   a base;
   a support standard extending vertically from said base;
   a structure extending vertically from said base;
   a first movable means connected to said structure and movable horizontally;
   bed means connected movably at one end thereof to said support standard;
   an extended jaw means disposed on one surface of said bed means at the other end thereof;
   link means operable by said first movable means connected to said structure for vertically moving said extended jaw means, thereby to move said bed means from a horizontal position;
   second movable means connected to said bed means on another side thereof;
   truck means movably positioned on said other side of said bed means and movable by said second movable means;
   and cutting means disposed on said truck means, said cutting means comprising
   a plurality of cutting edges disposed to be adjacent said surface of said slab having burrs along the cut edge thereof,
   a plurality of cutting tool means for holding each cutting edge, each having means for pivotal movement thereof,
   cutting tool holder means for attaching said cutting edges to said cutting tool means for holding,
   cutting tool support frame means for holding said cutting tool holder means and said connected cutting edges in a serial manner along the cut edge of said slab,
   rod means for selectively moving each of said cutting tool holder means about said means for pivotal movement, and
   cylinder means for moving said truck means in a horizontal direction to effect trimming of said slab, whereby said continuous cast slab after cutting is positioned substantially horizontally to have its cut edge having said burrs on one surface of said slab exposed to be cut by said plurality of cutting edges with selective upward and angular movement of said plurality of cutting edges to adjust for the contour of the surface of said slab.

2. The apparatus of claim 1, wherein said rod means for selective moving of said cutting means comprises a pair of cylinders having rounded tops, means connected to said cutting means for holding said cylinder, and means fit within said cylinder and having a rounded end disposed to be pushed by said rounded top of said cylinder, and means for selectively controlling the movement of said cylinders, whereby vertical and angular movement of each cutting edge is effected to follow the contour of the slab surface.

3. The apparatus of claim 1, wherein each said tool has an oblong hole at substantially the horizontal center thereof with the larger dimension of said hole being directed vertically.

* * * * *

UNITED STATES PATENT AND TRADEMARK OFFICE
CERTIFICATE OF CORRECTION

PATENT NO. : 4,362,448

DATED : December 7, 1982

INVENTOR(S) : Nobuhisa Hasebe; Hiroshi Kawada; Tatsuo Kobatake

It is certified that error appears in the above—identified patent and that said Letters Patent is hereby corrected as shown below:

Claim 1, line 4, change "said slab" to be -- said apparatus--

Signed and Sealed this

Twenty-first Day of June 1983

[SEAL]

Attest:

DONALD J. QUIGG

Attesting Officer

Acting Commissioner of Patents and Trademarks